United States Patent [19]

Meyer et al.

[11] Patent Number: 4,460,070
[45] Date of Patent: Jul. 17, 1984

[54] SPOT-TYPE BRAKE

[75] Inventors: Yves Meyer, Taverny; Jean-Jacques Carré, Montreuil, both of France

[73] Assignee: Societe Anonyme DBA, Paris, France

[21] Appl. No.: 461,839

[22] Filed: Jan. 28, 1983

Related U.S. Application Data

[63] Continuation of Ser. No. 244,497, Mar. 16, 1981, abandoned.

[30] Foreign Application Priority Data

May 6, 1980 [FR] France ................... 80 10089

[51] Int. Cl.³ ............... F16D 55/18; F16D 65/20
[52] U.S. Cl. ................. 188/73.1; 188/72.4; 188/73.33
[58] Field of Search .......... 188/71.1, 71.8, 72.4, 188/71.9, 73.1, 73.32, 73.33, 73.39, 73.45, 73.47, 70 R, 73.2, 218; 192/70.13, 65, 85 AA, 107 R

[56] References Cited

U.S. PATENT DOCUMENTS

| | | | |
|---|---|---|---|
| 2,057,796 | 10/1936 | Shelor | 188/72.4 |
| 2,356,233 | 8/1944 | Forbes | 188/72.4 |
| 2,946,408 | 7/1960 | Peras | 188/71.8 |
| 2,963,116 | 12/1960 | Peras | 188/71.9 |
| 3,952,841 | 4/1976 | Pringle | 188/71.8 |
| 4,030,576 | 6/1977 | Pringle | 188/71.8 |
| 4,122,920 | 10/1978 | Harvey | 188/73.45 |
| 4,209,083 | 6/1980 | Gerard | 188/73.32 |

FOREIGN PATENT DOCUMENTS

| | | |
|---|---|---|
| 1217223 | 5/1966 | Fed. Rep. of Germany . |
| 2651539 | 5/1977 | Fed. Rep. of Germany ... 188/73.45 |
| 2653860 | 6/1977 | Fed. Rep. of Germany ... 188/73.45 |
| 1129062 | 1/1957 | France . |
| 1129062 | 7/1959 | France . |
| 1129062 | 12/1959 | France . |
| 1319456 | 1/1963 | France ............... 188/72.4 |
| 1470500 | 1/1967 | France . |
| 2024737 | 8/1970 | France . |

Primary Examiner—Bruce H. Stoner, Jr.
Assistant Examiner—Robert J. Oberleitner
Attorney, Agent, or Firm—Paul David Schoenle; Ken C. Decker

[57] ABSTRACT

A spot-type brake comprises a caliper movable during braking to engage a pair of friction elements with a rotor. The rotor comprises a first part and a second part. The first part is engageable with radially outer portions of the pair of friction elements and the second part is engageable with radially inner portions of the pair of friction elements. The rotor parts and the pair of friction elements are V-shaped with the rotor parts forming a spacing therebetween to receive a movable support which urges one of the pair of friction elements into engagement with the rotor and a fixed support opposing the one friction element.

2 Claims, 6 Drawing Figures

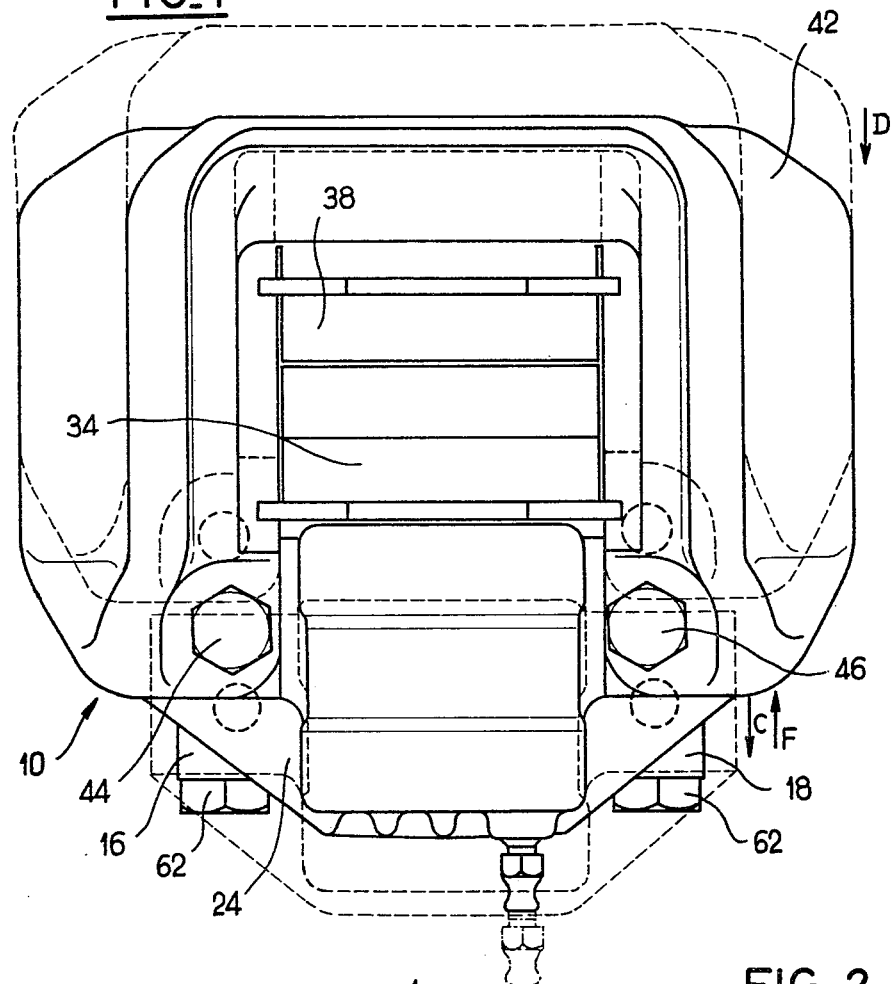
FIG_1
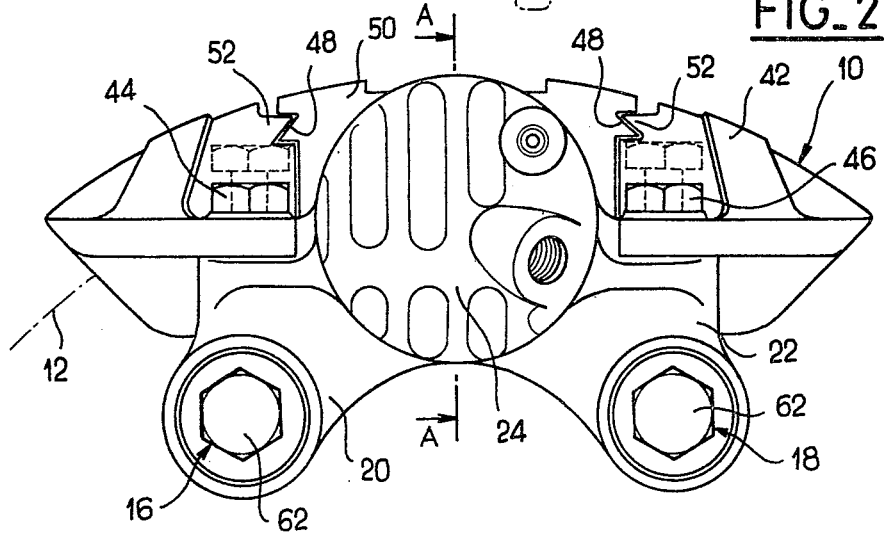
FIG_2

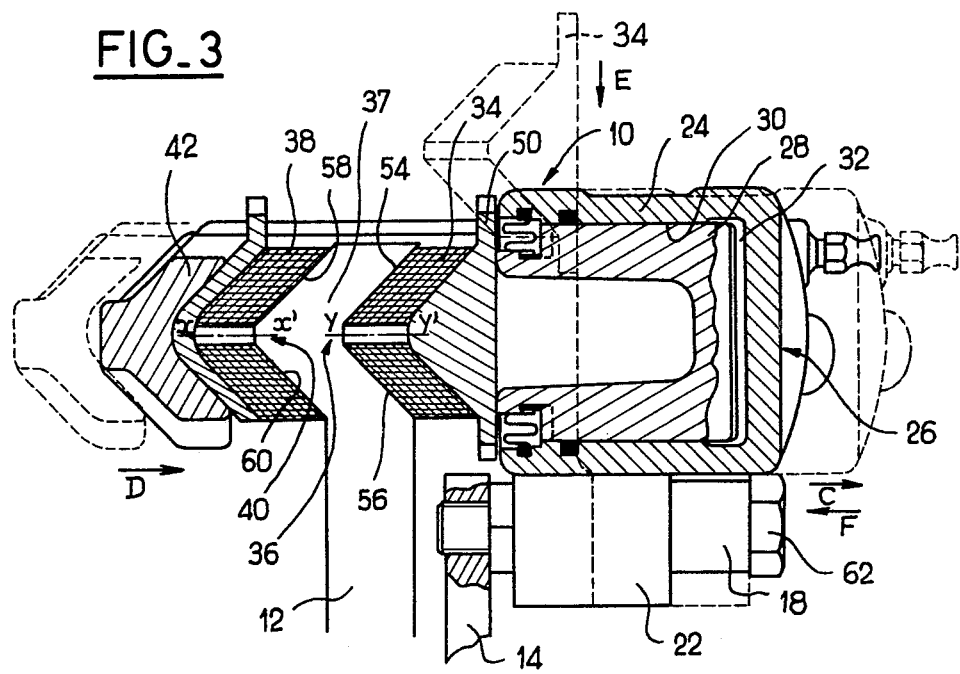
FIG_3
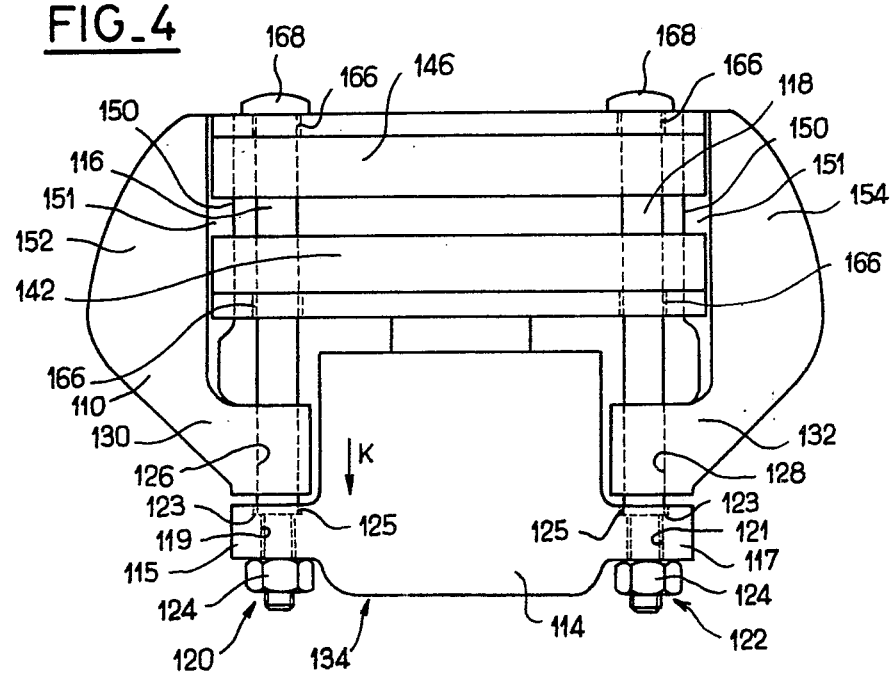
FIG_4

SPOT-TYPE BRAKE

This is a continuation of application Ser. No. 244,497 filed Mar. 16, 1981, now abandoned.

The subject of the invention is a spot-type brake, especially for a motor vehicle.

The invention particularly concerns a spot-type brake, i.e. with action localised over a small circumferential portion of the surface of revolution of a rotor, comprising at least one friction element received anchored and for sliding in a support and capable of coming into frictional engagement with a surface of revolution of a rotor which is to be braked, on operating of a brake motor acting axially on the friction element, which has a profile complementary to the profile of the surface of revolution of the rotor.

With this type of brake, an increase in the effectiveness in braking for a given radial space is often required or a reduction in the weight of such a brake for a given braking effectiveness and a given radial space. These requirements generally occur in combination with a requirement for friction elements with an extended life. These requirements often result in new brake designs for withstanding either the thrust stresses of larger brake motors or the same thrust stresses with less material, which can be expensive.

The subject of the invention is a spot-type brake of this type in which it is possible to achieve an increase in braking effectiveness and a reduction in weight, and, if necessary, an increase in the life of the friction elements.

With this aim, the invention proposes a spot-type brake comprising at least one friction element received anchored and for sliding in a support and capable of coming into frictional engagement with a surface of revolution of a rotor which is to be braked, on operation of a brake motor acting axially, i.e. parallel to the axis of the rotor, on said friction element, which has a profile complementary to the profile of said surface of revolution of said rotor, characterized in that said surface of revolution of said rotor, formed on a portion of said rotor, presents in axial section a profile with substantially the shape of an axial V whose bisectrix is substantially parallel to the axis of the rotor.

Two embodiments of the invention will now be described by way of non-limiting example, with reference to the attached figures in which FIGS. 1 to 3 represent one embodiment and FIGS. 4 to 6 represent a second embodiment:

FIG. 1 is a view from above of a spot-type brake made in conformance with the invention, showing the stages of assembling the brake;

FIG. 2 is a front view of the spot-type brake of FIG. 1 showing the stages of assembling the brake;

FIG. 3 is a sectional view at the line AA of FIG. 2 of the spot-type brake of FIG. 1 showing the stages of assembling the brake;

FIG. 4 is a view from above of a spot-type brake made in conformance with the invention according to a second embodiment;

Figure 5:
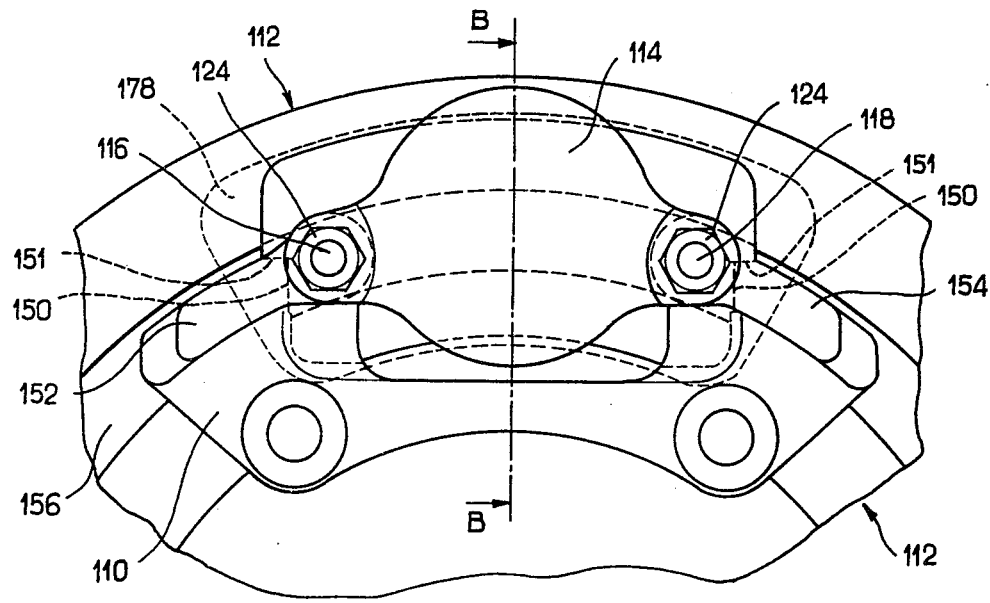
FIG. 5 is a front view of the spot-type brake of FIG. 4.

The spot-type brake in conformance with the invention represented in FIGS. 1 to 3 comprises a sliding caliper 10 straddling the rotor 12 provided to be coupled for rotation with a vehicle wheel (not represented). The caliper 10 is mounted to slide on a fixed part 14 of the vehicle by means of axial columns 16 and 18 circumferentially spaced whose axes are substantially parallel to the axis of the rotor 12. The columns 16 and 18 are disposed between the fixed part 14 and arms 20 and 22 formed in a mounting 24 of the caliper 10. The mounting 24 has actuating means 26 constituted by a hydraulic brake motor comprising a piston 28, mounted to slide in a bore 30 defined in the mounting 24, sensitive to the pressure prevailing in a control chamber 32 capable of being connected to a pressure source such as, for example, the master-cylinder of a vehicle (not represented). The piston 28 is disposed so as to urge a first friction element 34 directly against a first surface 36 of revolution formed on a portion 37 of the rotor 12 when the fluid under pressure is allowed into the chamber 32. The caliper 10 is capable of moving by reaction which leads to its sliding on the columns 16 and 18 so as to urge a second friction element 38 against another surface 40 of revolution of the rotor 12 by means of the support 42 of the caliper 10 fixed on the mounting 24 by two bolts 44 and 46. As FIG. 2 shows in particular, the friction element 34 is received anchored and for sliding in the support 42 by means of openings 48 made in the padholder 50 cooperating with projections 52 made on the support 42. The second friction element 38 is received anchored in the support 42 in an identical way. In an axial section, the surface 36 of revolution presents a profile with substantially the shape of a V whose bisectrix yy' is substantially parallel to the axis of the rotor 12. This surface 36 is depressed and is constituted by two frusto-conical surfaces 54 and 56. In axial section, the friction element 34 presents a profile which is substantially complementary to the profile of the surface 36 of revolution. In axial section, the surface 40 of revolution presents a profile substantially in the shape of a V whose bisectrix xx' is substantially parallel to the axis of the rotor 12. This surface 40 projects and is constituted by two frusto-conical surfaces 58 and 60. In axial section, the friction element 38 presents a profile which is substantially complementary to the profile of the surface 40 of revolution. The surfaces 36 and 40 of revolution have bisectrices xx', yy' of their V-shaped profiles which are substantially identical. The frusto-conical surfaces 54, 56, 58 and 60 have substantially identical vertex angles.

In the embodiment represented and as shown more particularly in FIG. 3, the two columns 16 and 18 are connected to the fixed part 14 of the vehicle by a threaded connection. More precisely, the columns 16 and 18 which allow the sliding movement of the caliper 10 are mounted screwed on said fixed part of the vehicle. In the example represented, each of the columns is provided with a hexgonal head 62 allowing screwing of the columns by means of a corresponding key (not represented).

It will be understood that the surfaces of revolution of the rotor can have profiles in axial section which are both directed in a direction opposite to that represented in the embodiment described or each directed in the opposite direction to the other.

The operation of mounting the brake on the vehicle is carried out in the following way, as regards the embodiment represented in FIGS. 1 to 3:

The columns 16 and 18 are mounted in advance in the arms 20 and 22 of the mounting 24 and then the assembly is screwed on the fixed part 14 of the vehicle by means of the hexagonal heads 62 of the columns 16 and 18. The support 42 is equipped with the friction element 38 in advance. The mounting 24 is moved back in the direction indicated by the arrow C so as to assume the position indicated in FIGS. 1 and 3. The support 42 is presented to the rotor in the direction indicated by the arrow D as indicated in 1 and 3. The friction element 34 is put in position radially in the direction indicated by the arrow E, as indicated in FIG. 3, and then engaged on the projections 52 of the support 42. The mounting is then brought in the direction indicated by the arrow F as indicated in FIGS. 1 and 3 so as to allow the support 42 to be fixed on the mounting 24 by two bolts 44 and 46 with hexagonal heads by means of a corresponding key (not represented).

Figure 6:
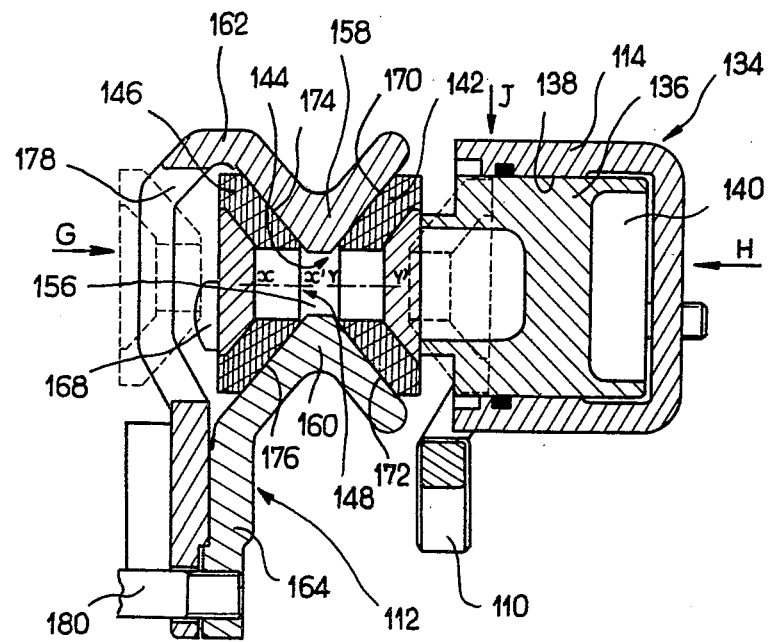
FIG. 6 is a sectional view at the line BB of FIG. 5 of the spot-type brake of FIG. 4, showing the stages of assembling the brake.

In the embodiment represented in FIGS. 4 to 6, the spot-type brake according to the invention has a fixed support 110 intended to be coupled with a fixed part of the vehicle (not represented) and constituted in the embodiment represented by a plate disposed near a rotor 112 intended to be coupled for rotation with the wheel of a vehicle (not represented). The fixed support 110 receives slidingly a sliding mounting 114 by means of connection members which, in the embodiment represented, are two axial tie shafts 116 and 118 substantially parallel to the axis of the rotor and circumferentially spaced. The mounting 114 has two fixing lugs 115 and 117 provided with orifices 119 and 121 for the passage of the tie shafts 116 and 118. The fixing lugs 115 and 117 bear a facing 123 on which enlarged regions 125 of the tie shafts 116 and 118 bear axially in the direction of the arrow K. These two shafts 116 and 118 are fixed to the mounting 114 by threaded connections 120 and 122 with hexagonal nuts 124 by means of a corresponding key (not represented). The two shafts 116 and 118 are received in the bores 126 and 128 of the sliding arms 130 and 132 formed in the support 110.

The mounting 114 has actuating means 134 constituted by an hydraulic brake motor (see FIG. 6) comprising a piston 136 mounted slidingly in a bore 138 defined in the mounting 114 and sensitive to the pressure prevailing in a control chamber 140 capable of being connected to a source of pressure such as, for example, the vehicle master-cylinder (not represented). The piston 136 is arranged so as to urge a first friction element 142 directly against a first surface 144 of revolution of the rotor 112 when the fluid under pressure is allowed into the chamber 140. The mounting 114 is capable of moving by reaction, causing it to slide on the sliding arms 130 and 132 so as to urge a second friction element 146 against a second surface 148 of revolution of the rotor 112 by means of two tie shafts 116 and 118. As shown in more detail in FIG. 4, in which, for easier understanding, the rotor has not been represented, the friction element 142 is received anchored and for sliding by the edges 150 and 151 of two arms 152 and 154 circumferentially spaced on the fixed support 110. These arms 152 and 154 pass through the annular space 156 defined between the portions 158 and 160 of the two parts of revolution 162 and 164 constituting the rotor 112 so as to receive anchored and for sliding the second friction element 146 in an identical way to that used for the first friction element 142. The tie shafts 116 and 118 pass through the friction elements 142 and 146 by way of orifices 166 made in said friction elements, and the annular space 156. The second friction element is capable of being urged against the second surface 148 of revolution by means of head portions 168 formed in the tie shafts 116 and 118.

From FIG. 4 in particular it would appear that the tie shafts 116 and 118 are small in section. In actual fact, said tie shafts do not bear circumferential stresses which are wholly supported by the anchoring arms 152 and 154 of the support 110.

The first surface 144 of revolution whose axial section presents the profile of an axial V, i.e. whose bisectrix yy' is parallel to the axis of the rotor, is formed by the frusto-conical surface 170 on the portion 158 of the part of revolution 162 and by the frusto-conical surface 172 on the portion 160 of the part of revolution 164. In axial section, the friction element 142 presents a profile which is substantially complementary to the profile of the surface 144 of revolution.

The second surface 148 of revolution whose axial section also presents the profile of an axial V, i.e. whose bisectrix xx' is parallel to the axis of the rotor, is formed by the frusto-conical surface 174 on the portion 158 of the part of revolution 162 and by the frusto-conical surface 176 on the portion 160 of the part of revolution 164. In axial section, the portion 160 of the part of revolution 164 presents a profile which is substantially in the shape of a radial V, i.e. whose bisectrix is perpendicular to the axis of the rotor and bears the frusto-conical surfaces 172 and 176. The points of the two radial Vs of the portions 158 and 160 are directed towards the annular space 156 which they define together.

The frusto-conical surfaces 170, 172, 174 and 176 have vertex angles which are substantially identical and are substantially coaxial.

The part of revolution 162 has at least one aperture 178 allowing passage of the friction element 146.

The parts of revolution 162 and 164 forming the rotor 112 are fastened together by means of means 180 for connecting the rotor to a revolving part of the vehicle (not represented).

The operation of mounting the brake on the vehicle is carried out in the following way, as regards the embodiment represented in FIGS. 4 to 6:

The fixed support 110 is mounted on a fixed vehicle-part (not represented). The friction element 146 is put in position in the direction indicated by the arrow G (FIG. 6) on the arms 152 and 154 of the fixed support 110, more accurately on the anchoring and sliding surfaces 150 and 151, through the aperture 178 of the part of revolution 162 of the rotor 112. The friction element 142 is put in position in the direction indicated by the arrow H (FIG. 6) on the arms 152 and 154, after having been introduced in the direction indicated by the arrow J (FIG. 6) between the arms 130 and 132 on the one hand and the rotor 112 on the other. The tie shafts are introduced in the direction indicated by the arrow G into the apertures 166 in the friction element 146 and then, continuing the movement in the direction indicated by the arrow G in the annular space 156, into the apertures 166 in the friction element 142 and into the bores 126 and 128 in the sliding arms 130 and 132 of the support 110.

The mounting 114 is mounted on the shafts 116 and 118 in the direction indicated by the arrow H by means of the orifices 119 and 121 in the lugs 115 and 117 of FIG. 6, the facings 123 coming to bear on the enlarged regions 125 of the shafts 116 and 118. The nuts 124 are tightened with a corresponding key (not represented).

Removal of the brake is carried out in reverse order of the operations just described.

It is clear that the more acute the angle between the two branches of the axial V of the profile of the axial section of the rotor, is, the less will be the axial force to be applied on the friction elements for the same braking effectiveness, which allows a reduction in the weight of the spot-type brake. Conversely, with a spot-type brake of the same weight, a greater braking effectiveness can be obtained.

It is also clear that it is possible to increase braking effectiveness with the friction elements having the same area and occupying the same radial space, since the distance between the axis of the rotor and the axis of the brake motor can be increased by an amount which depends on the angle formed between the branches of the axial V. Conversely, without increasing the distance between the axis of the rotor and the axis of the brake motor, the area of the friction elements can be increased and hence their life in a given radial space.

It is obviously possible to combine an increase in braking effectiveness with an extension of friction-element life. It therefore appears, from reading what precedes, that a spot-type brake made as previously described and cooperating with a rotor which bears surfaces of revolution whose axial section presents a profile in the shape of an axial V allows a reduction in the weight of such a brake, an increase in its braking effectiveness and an increase in the life of the friction elements.

We claim:

1. A spot-type brake comprising a pair of friction elements cooperating with a movable support during braking to engage a rotor to be braked, the movable support being slidable relative to a fixed support, each of the pair of friction elements defining a profile in an axial section substantially the shape of a V whose bisectrix is substantially parallel to the axis of rotation for the rotor, characterized in that said rotor comprises a two-part assembly, the first part being engageable with radially outer portions of said pair of friction elements and the second part being engageable with radially inner portions of said pair of friction elements, said first and second parts forming a radial V for each part and an annular space therebetween, the radial V for said first part defining frusto conical surfaces approaching each other in a radially inward direction, the radial V for said second part defining frusto conical surfaces approaching each other in a radially outward direction, said movable support including connecting means extending into said annular space in order to engage one of said pair of friction elements and dispose the latter adjacent said first and second parts, and said fixed support extending through said annular space in order to oppose said one friction element.

2. The spot-type brake of claim 1 in which said fixed support carries said one friction element for sliding movement and said connecting means engages said one friction element solely to move the latter on said fixed support.

* * * * *